United States Patent [19]

Pertzsch et al.

[11] Patent Number: 4,473,198
[45] Date of Patent: Sep. 25, 1984

[54] SPOOL FOR VIDEO CASSETTE

[75] Inventors: Albert Pertzsch; August Liepold, both of Munich; Hubert Brunner, Weil, all of Fed. Rep. of Germany

[73] Assignee: Agfa-Gevaert AG, Leverkusen, Fed. Rep. of Germany

[21] Appl. No.: 406,536

[22] Filed: Aug. 9, 1982

[30] Foreign Application Priority Data

Aug. 18, 1981 [DE] Fed. Rep. of Germany ....... 3132582

[51] Int. Cl.³ .................... G03B 1/04; G11B 15/32; B65H 75/18
[52] U.S. Cl. .................. 242/197; 242/71.8; 242/199
[58] Field of Search ............ 242/192, 197–200, 242/71.8, 71.9; 360/96.1, 132; 226/190, 194

[56] References Cited

U.S. PATENT DOCUMENTS 3,869,099  3/1975  Inaga ..................... 242/199
4,234,137  11/1980  Watanabe et al. ........... 242/71.8

FOREIGN PATENT DOCUMENTS 948364  8/1956  Fed. Rep. of Germany ...... 242/198
1448323  8/1974  United Kingdom .

Primary Examiner—Leonard D. Christian
Attorney, Agent, or Firm—Connolly and Hutz

[57] ABSTRACT

This invention relates to a spool for video cassettes comprising at least one flange which is raised from or deposited onto the base of the cassette against the force of a spring. The spool has a hollow-cylindrical projection (11) which is open to the outside, in the center of the top of the spool hub, in which projection (11) a spherical body (12) of abrasion-proof plastics material is clamped, for example, polyoxymethylene. The spherical cap protruding from the projection protrudes beyond other pins (10) which are optionally moulded on the surface. The spool itself is made of a different, plastics material of less hardness compared with that of the spherical body.

3 Claims, 4 Drawing Figures

SPOOL FOR VIDEO CASSETTE

This invention relates to spools for video cassettes which are raised from the base of the cassette against the force of a spring while the cassette is being introduced into a recording/playback device and are returned on to the base of the cassette when the cassette is removed.

In known video systems, cassettes are used which comprise two axially parallel, plastics spool bodies. The spool bodies comprise one or two flanges having a centre winding hub, to which a magnetic tape is secured. In order to obtain a spool which is to be handled consistently for several purposes, one flange is always connected to the winding hub, i.e. it is produced in one piece, whereas the second flange, if required, is of an attachable design. For this purpose, a number of projections or pins are distributed over the entire top surface of the winding hub, which projections or pins are engagable with the second flange which also has holes which are distributed accordingly. In the case of video cassettes, in which the tape coils are raised against the pressure of a resilient spring when the cassette is introduced into the recorder, a conical-shaped projection is located centrally of the individual spools on the top of the winding hubs which is higher than the other elevations or pins mentioned. Both ends of the resilient spring positioned on the inside of the cassette cover is in constant point contact with the centre of a projection. This provides a stable mounting for the tape spools between leaf spring and the driving spindles on the device. During the operation of the cassette, the projection is exposed to constant friction by the rotation of the spools. In order to avoid wear, it is necessary to use a material for the projection which has a high hardness, rigidity, abrasion resistance and a favourable friction coefficient. The plastics material polyoxymethylene (POM) is a material which meets these conditions. However, a plastics material of this type is expensive and thus increases the production costs of the spools which are generally produced by the injection moulding process. It is for these reasons that a change has been made to producing the spools in two parts. One part of the spool, namely the winding hub and one flange is made of the hard and expensive material and the second flange is made of cheaper plastics (see U.S. Pat. No. 4,234,137). Spools comprising two flanges, as used for the VHS type of video cassette, are still produced, as before, in one part, that is, of only the expensive plastics material.

An object of the present invention is to provide a spool for video cassettes comprising one or two flanges, the production costs of which may be reduced, compared with the present prior art, by reducing the consumption of expensive abrasion-proof plastics materials.

According to the present invention there is provided a spool for video cassettes with at least one flange, which is raised from the base of the cassette against a spring force when the cassette is introduced into a recording/playback device and is deposited on this base when the cassette is removed, comprising a hollow-cylindrical projection 11 which is open to the outside arranged in the centre of the top of the spool hub, in which projection 11 a spherical body 12 of abrasion-proof plastics material is clamped such that the cap protruding from the projection protrudes beyond other pins 10 optionally moulded on the surface, and the spool itself is made of a different plastics material of less hardness compared with that of the spherical body.

With this invention, the use of an expensive plastics material is restricted to that part of the spool alone which must satisfy the requirements of abrasion resistance in the cassette. The ball is inserted by simply pressing it into the hollow-cylindrical projection. The remainder of the spoolbody, namely the winding hub and flange may be produced from other, cheaper plastics materials, such as for example acrylonitrile-butadiene-styrene (ABS) copolymers and polystyrene. As a result of this measure, the production costs of a video spool which has the feature according to the present invention may be greatly reduced. However, another advantage of the present invention is that the flanges which are made of plastics materials, such as ABS copolymers have a more regular thickness over the entire profils, because they may be processed by an improved injection moulding method. On the other hand, spools made of POM plastics often exhibit fluctuations in thickness over the complete profile, and mainly on the inside of the flange, which has an unfavourable effect on the tape winding.

The present invention will now be described in more detail with reference to the drawings.

Figure 1:
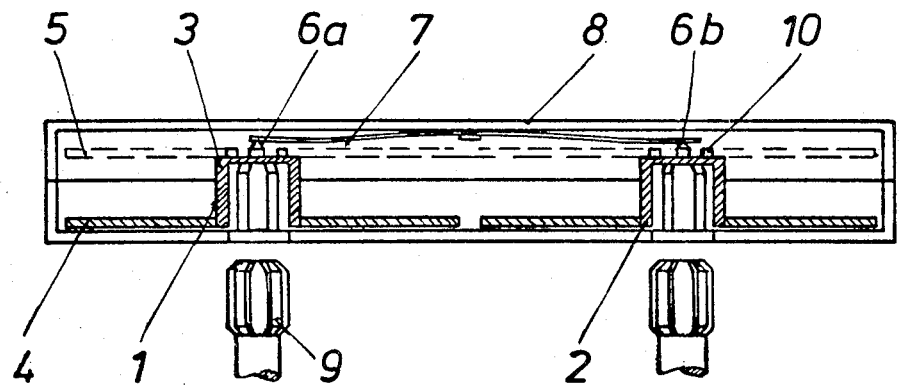
FIG. 1 illustrates a longitudinal section through a standard video cassette having a spool and a pressure spring.
Figure 2:
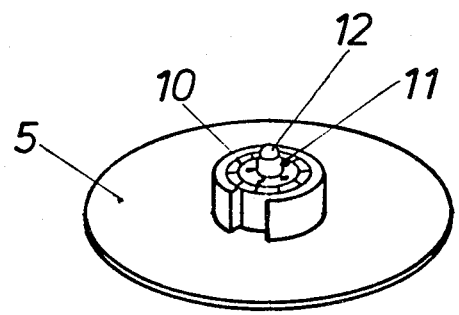
FIG. 2 illustrates a perspective view of a video spool according to the present invention, having a centrally positioned hollow-cylindrical projection.
Figure 3:
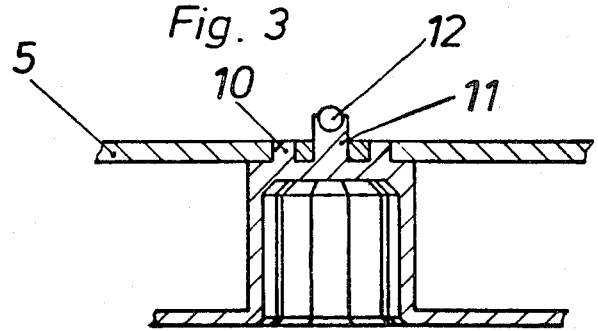
FIG. 3 illustrates a cross-section through a video spool according to the present invention having a ball inserted into the hollow-cylindrical attachment.
Figure 4:
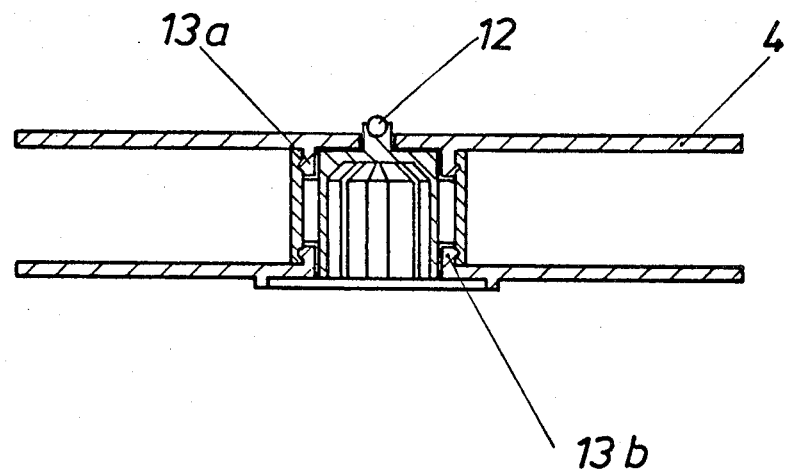
FIG. 4 illustrates a cross-section through a spool according to the present invention having attached flanges.

FIG. 1 illustrates in longitudinal section, a video cassette of the VHS type in which inserted spools 1,2 are arranged coaxially. Each of the spools 1,2 comprises a winding hub 3 on which the magnetic tape is wound, and two flanges 4,5 which are positioned on the upper and lower ends of the winding hubs. The upper or second flange is illustrated in the Figure in dashed lines and, in practice, is frequently only attached to the winding hub after the tape has been wound on. A spherical projection 6a, 6b is located centrally on the top of the winding hub and is in constant contact with a leaf spring 7. The leaf spring is attached to the inside of the cassette cover 8. Driving spindles 9 which engage in the hollow winding hubs, raise the spools from the base of the cassette when the cassette is inserted in the device and return them to rest on the cassette base when the cassette is removed. In addition to the projection, other pins 10 may be distributed on the top of the winding hub for connecting the second flange to the winding hub by means of corresponding holes. Thus, the spherical projection must be of a slightly raised design with respect to these pins, in order to be able to remain in firm contact with the spring. As already mentioned, the projection is subjected to a particularly high and continuous friction, so that this part must be produced from particularly abrasion-proof plastics material. However, since the spools are to be produced integrally as far as possible so as to keep production and packing expenditure to a minimum, they have hitherto been made of the expensive abrasion-proof plastics material. FIGS. 2 and 3 illustrate a design for the spool according to the present invention which reduces to a minimum the consumption of expensive plastics material. According to the present invention, a hollow-cylindrical projection 11 which is open to the outside and receives a ball 12 made of an abrasion-proof plastics material, for example polyoxymethylene (POM) is located in the centre of the winding hub surface. The ball 12 is secured simply by being pressed in. The projection with its projecting cap, is slightly higher than the pins 10 which are also optionally positioned on the top for receiving a second flange. The remainder of the spool, excluding the ball, is made of a cheaper plastics material which is otherwise used in conventional manner for audio spools, for example, acrylonitrilebutadienestyrene copolymer or impactresistant polystyrene.

In addition to the reduction in expensive plastics material used, there is a further advantage in that over a spool made of POM, when, for example, acrylonitrilestyrene polymer is used for the spool, the surfaces of the flanges produced are of a constant thickness, an impossibility when polyoxymethylene plastics are used. This results in perfect tape coils when the video tape is wound and unwound. Now, it is also possible in practice to produce the spools cheaply in several parts, that is, to produce the winding hubs and flanges separately from each other as individual parts. This has the advantage that when the magnetic tape is wound on to the severing machine, on which the wide, coated magnetic film arriving from the casting machine is cut into corresponding formats, for example, ½" and the resulting tapes are wound in a suitable length on winding hubs, the tape no longer comes into contact with the flanges and the edges cannot be deformed. Compared with the winding procedure which involves spools provided with flanges, this winding procedure is substantially facilitated by this measure. In order to attach the flanges to one or both ends, the winding hub having the projection according to the present invention may have a circular groove on the inside circumference, into which an annular enlargement $13a$, $13b$ of a correspondingly designed flange snaps. When a snap fastening of this type is used, it is possible to dispense with the pins 10 on the surface of the winding hub for attaching and riveting a flange.

We claim:

1. In a spool for a video tape cassette the combination comprising:
    a pair of flanges,
    a cylindrical spool hub extending axially between said pair of flanges,
    a cylindrical projection protruding axially from said hub and said flanges,
    a hollow at the outer end of the cylindrical projection having an outward opening, spaced axially from said hub,
    a spherical body of a material of higher abrasion resistance than the material comprising the spool hub and flanges, positioned in said hollow on the spool axis,
    so constructed and arranged that said spool is rotatable on its axis while said spherical body is engageable with a spring means.
2. The combination as claimed in claim 1 wherein a plurality of pins extends in a direction parallel to but radially spaced from the spool axis and the hollow is spaced axially beyond said pins.
3. In the combination as claimed in claim 1 the spherical body is made of polyoxymethylene and the flanges and hub of the spool consists of acrylonitrile butadiene styrene copolymer.

* * * * *